(No Model.)

L. BENVENISTI.
HANDLE FOR COOKING UTENSILS.

No. 430,984. Patented June 24, 1890.

Witnesses:

Inventor:
Leon Benvenisti
by his attorney
B. K. Harding

UNITED STATES PATENT OFFICE.

LEON BENVENISTI, OF PHILADELPHIA, PENNSYLVANIA.

HANDLE FOR COOKING UTENSILS.

SPECIFICATION forming part of Letters Patent No. 430,984, dated June 24, 1890.

Application filed December 12, 1889. Serial No. 333,496. (No model.)

*To all whom it may concern:*

Be it known that I, LEON BENVENISTI, a subject of the Sultan of Turkey, residing at Philadelphia, county of Philadelphia, and State of Pennsylvania, have invented a new and useful Improvement in Detachable Handles for Cooking Utensils, of which the following is a full, clear, and exact description, reference being had to the accompanying drawings, which form a part of this specification.

My invention relates to improvements in handles for cooking utensils; and the object of my invention is to provide a handle for cooking utensils which may be detached from the utensils.

The advantage of my invention is obvious, in that pots and pans can be placed on the fire and the handle can then be detached from the cooking utensil, and the pot or pan will take up much less room than if the handle be fixedly attached to it, as is the case with the handles of every cooking utensil at present.

My improvement is especially advantageous for use on pans, &c., used in roasting and frying, as the pan can be placed on the fire or in the oven, and the door can be closed, and when it is desired to remove the utensil the handle can be inserted in its socket and the utensil lifted by the handle.

Another advantage is that the pot or pan may become very much heated, yet the handle, being detached therefrom, will, of course, not become heated. It will not be necessary to use a cloth or other means to prevent the handle of the pot or pan from burning the hand of the operator. I attain these objects by the mechanism illustrated in the accompanying drawings, in which—

Figure 1:
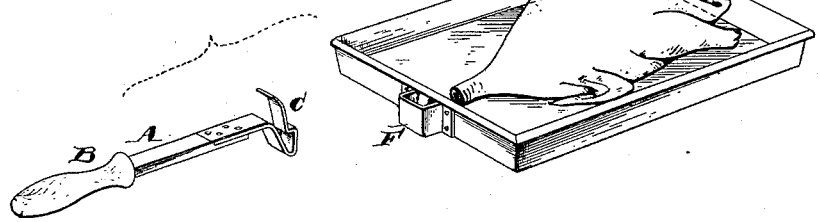
Figure 2:
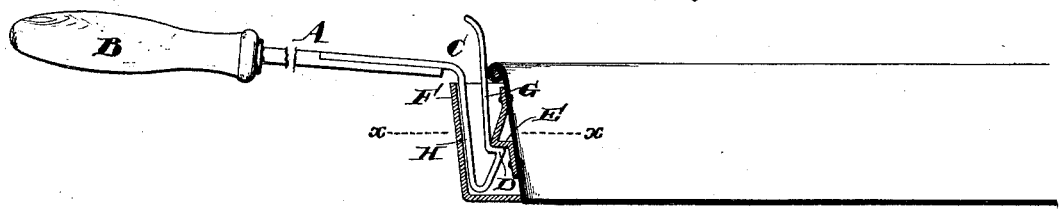
Figure 3:
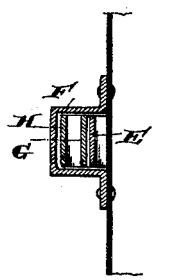
Figure 4:
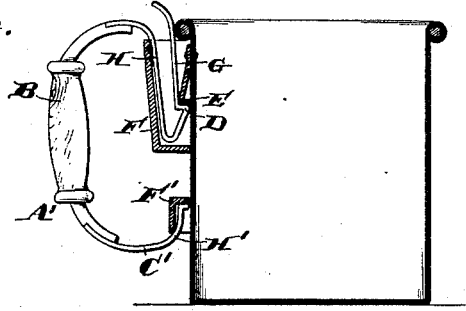

Figure 1 is a perspective view of the detachable handle and roasting-pan, showing the handle detached. Fig. 2 is a side view of the handle inserted in the socket of the pan and a vertical sectional view of the pan and socket. Fig. 3 is a longitudinal sectional view of the pan and socket on the line *x x* in Fig. 2. Fig. 4 is a side view of a detachable bow-handle inserted in sockets in a pot, and sectional view of the sockets and pot.

Similar letters refer to similar parts throughout the several views.

The detachable handle A may be made of any suitable material, and preferably is surrounded with the outer handle B. Attached to the handle A is the spring C, though it is obvious that the spring C could be made integral with the handle A. The spring C is bent down, as shown clearly in Fig. 2, and has on it the projection D, which is adapted to be engaged by the projection E in the socket of the cooking utensil. It will be seen from an inspection of Fig. 3 that the projection D is made of the same width as the socket F, in which it fits, and thus the cooking utensil is held steady on the handle. In order to withdraw the detachable handle from the cooking utensil, the legs G and H are brought together. The projection D will not then engage with the projection E, and the handle can be removed from the cooking utensil. It is obvious from an inspection of the drawings, Fig. 2, that the detachable handle can be inserted in the socket of the cooking utensil by pressing it down. The legs G and H will be forced together and the projection D will pass the projection E, and after it has so passed it the spring will cause the leg G to move out from the leg H and the projection D will then engage the projection E. When the handle is inserted in its socket, it will be held securely there, and the cooking utensil can be lifted and carried about with the same safety and ease as though the handle were rigidly attached to the cooking utensil.

In Fig. 4 is shown my improvement applied to a bow-handle. The cooking utensil shown there has two sockets, one for each end of the bow-handle. The spring C is inserted in the same manner as it is inserted in the cooking utensil shown in Figs. 1 and 2, and described. The spring C', which is attached to the lower part of the handle A', is inserted in the socket F'. As the legs G and H are the same width as the socket F, and the leg H' the same width as the socket F', it is evident that the cooking utensil shown in Fig. 4 will be held perfectly firm on the handle.

Having now fully described my invention, what I claim as new, and desire to secure by Letters Patent, is—

1. In a vessel or cooking utensil, in combination, a socket, as F, from said cooking utensil, a projection attached to the vessel within the socket, a handle, and a spring attached to said handle, said spring being formed of two legs, one of which is provided with an inset adapted to rest within the socket F and under and against the projection from the utensil, the other leg being adapted to rest against the frame of the socket F.

2. In a vessel or cooking utensil, in combination, a socket, as F, from said cooking utensil, a projection attached to the vessel within the socket, said projection being of the same width as the socket, a handle, a spring attached to said handle, said spring being formed of two legs, one of which is provided with an inset adapted to rest within the socket F and under and against the projection from the utensil, the other leg being adapted to rest against the frame of the socket F, the extent of the inset in the leg being equal to the extent of the projection from the utensil.

3. In a vessel or cooking utensil, in combination, a socket, as F, from said cooking utensil, a projection attached to the vessel within the socket, a handle, a spring attached to said handle, said spring being formed of two legs, one of which is provided with an inset adapted to rest within the socket F and under and against the projection from the utensil, the other leg being adapted to rest against the frame of the socket F, a projection from said utensil, as F', and a spring-arm, as C', attached to said handle, the end of said spring C' being of substantially the same form as the projection F'.

4. In a vessel or cooking utensil, a socket, as F, from said cooking utensil, a projection attached to the vessel within the socket, said projection being of the same width as the socket, a handle, a spring attached to said handle, said spring being formed of two legs, one of which is provided with an inset adapted to rest within the socket F and under and against the projection from the utensil, the other leg being adapted to rest against the frame of the socket F, the extent of the inset in the leg being equal to the extent of the projection from the utensil, a projection from said vessel, as F, and a spring-arm, as C', attached to said handle, the end of said spring-arm C' having substantially the same form as the projection F'.

5. In a cooking utensil, in combination, a detachable handle having springs at its ends, and sockets attached to the cooking utensil in which the said springs fit.

6. In a cooking utensil, in combination, a detachable bow-handle having springs at its ends, one of the springs having a projection on one of its legs, and sockets in which the said springs fit, one of the sockets having a projection with which the projection on the leg of one of the springs engages.

In testimony of which invention I have hereunto set my hand.

LEON BENVENISTI.

Witnesses:
ABNER J. DAVIS,
JOHN GIBSON.